Feb. 23, 1937.  F. L. O. WADSWORTH  2,071,668
BRAKE
Filed July 27, 1932   2 Sheets-Sheet 1

INVENTOR.
FRANK L.O. WADSWORTH
BY
ATTORNEY.

Feb. 23, 1937.  F. L. O. WADSWORTH  2,071,668
BRAKE
Filed July 27, 1932  2 Sheets-Sheet 2

INVENTOR.
FRANK L. O. WADSWORTH
BY
F. P. Keyser
ATTORNEY.

Patented Feb. 23, 1937

2,071,668

UNITED STATES PATENT OFFICE 2,071,668

BRAKE

Frank L. O. Wadsworth, East Liberty, Pa., assignor to Bendix Aviation Corporation, South Bend, Ind., a corporation of Delaware Application July 27, 1932, Serial No. 625,115

10 Claims. (Cl. 188—78)

This invention relates to brakes, and more particularly to brakes of the internal expanding type, in which a friction shoe of some length—such for example as a full wrap band or flexible ring—is used. This type of brake mechanism is very powerful because of its high factor of self-actuation or self energization; but it is correspondingly "sensitive" to variations in the coefficients of friction of the braking surfaces, and to involuntary movements of the actuating mechanism; and is, to that extent, unreliable and uncontrollable in its action.

In the usual form of internal expanding brake using a long floating shoe, which is adapted to engage at either end with a common anchor or with two adjacent anchors, the expanding action is usually obtained by the application of a spreading force to the ends of the shoe; and thus producing, indirectly, a contact pressure engagement between the outer surface of the expanded shoe member and the inner surface of a brake drum. Such actuating mechanisms have the disadvantages of producing an undue amount of wear adjacent the ends of the shoes, and of not obtaining an even or uniformly graduated, application or engagement of the friction surfaces throughout their entire length. They also tend to move one or both of the shoe ends away from the anchor prior to engagement of the friction surface with the drum, thus resulting in a "click" or "slam" when this engagement occurs, and the brake shoe or ring is brought to anchored position.

One of the primary purposes of the present invention is to provide a brake organization which does not have the defects and disadvantages above pointed out; and which is adapted to concurrently or progressively apply an expanding pressure to the brake shoe or ring at a plurality of circumferentially spaced intervals in such manner as to obtain a smooth quiet and controlled action which is free from the tendency to "grab" or lock when the brake is suddenly applied in emergency stops.

Another object of the invention is the provision of an improved actuating means capable of radially expanding the shoe of the brake, at a plurality of points, by a direct application of radially directed forces.

A further object of these improvements is to provide an expanding mechanism which is adapted to enlarge the diameter of the brake ring by a combination of circumferentially directed, or tangentially applied, forces acting on the ends of the said ring, and of radially directed, or transversely applied, forces acting on the intermediate portions thereof, to thereby obtain, and maintain, a predetermined control of the contact pressure engagement between different zonal regions of the frictionally engaged surfaces, and thereby regulate or systematize the effect of the self energization or self actuation of the revolving drum on the relatively stationary brake ring.

Still another object of the invention is the provision of novel adjusting means wherein the width, or circumferential spread, of the anchor member may be varied to compensate for brake shoe wear.

A further object of the invention is the provision of an adjustment for the actuating means which is adapted to be operated simultaneously, and in conformity, with the adjustment for brake shoe wear.

A still further object of the invention is the provision of a single unit adjusting mechanism which is adapted to concurrently take up clearance due to wear, and to maintain, or restore the initial setting or relationship of the elements of the brake applying mechanism.

Another object of the invention is the provision of actuating means which are adapted to initially engage a central or intermediate portion of the brake shoe with the brake drum, and there expand the remaining portions of the said shoe into contact therewith.

Still another object of these improvements is to provide an improved means for easily attaching a lining strip to the brake ring member without the use of any rivets or similar devices such as are now commonly employed for that purpose.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Figure 5 is a side view of the anchor member of Figure 7 construction;

Figure 1:
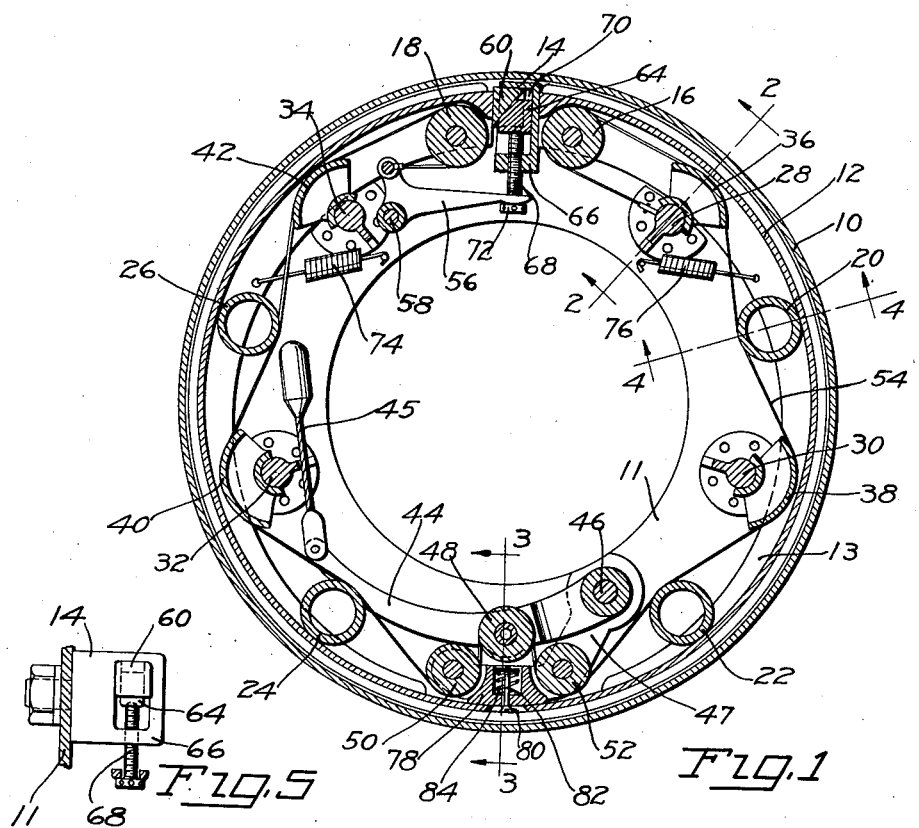
Figure 1 is a front elevation partly in section of a brake embodying a preferred form of applying mechanisms in accordance with the invention.
Figure 2:
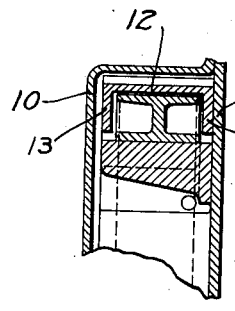
Figure 2 is a section on the line 2—2 of Figure 1 illustrating a stationary guide for the actuating means.
Figure 3:
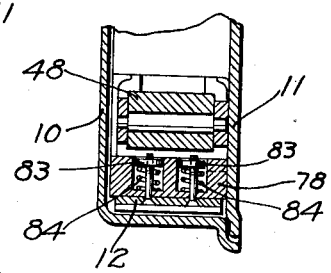
Figure 3 is a section on the line 3—3 of Figure 1 showing a part of the actuating lever and the adjacent portions of the brake shoe and drum assembly.
Figure 4:
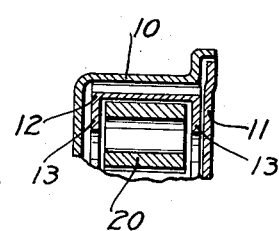
Figure 4 is a section on the line 4—4 of Figure 1 showing a thrust roller in engagement with the shoe.

Referring more particularly to Figure 1, and the details thereof shown in Figures 2, 3, 4 and 5, there is illustrated the usual brake drum 10, a full wrap floating friction shoe or brake ring 12, and a novel form of an adjustable anchor 14. For the purpose of applying the friction shoe to the drum, rollers 16 and 18 are rotatably mounted between the side flanges 13—13 at each end of the shoe and a plurality of hollow rolls 20, 22, 24 and 26 are held in free rolling contact with the inner surface of the web thereof at a series of symmetrically spaced intervals around its periphery. Stationary supports 28, 30, 32, and 34 are also provided to carry a corresponding number of segmental rocker members 36, 38, 40, and 42 which are interposed between the rolls 20, 22, 24 and 26. An actuating lever 44, pivoted as shown at 46 on the backing plate bracket 47 carries a roller 48 which is positioned between two rollers 50 and 52 that are rotatably mounted on this same bracket (47). A flexible ribbon tension member 54, which may be made of spring steel or any suitable material, is secured at one end to the support 28 and is threaded over and around the successive roller and rocker members 16, 36, 20, 38, 22, 52, 48, 50, 24, 40, 26, 42, and 18; and is then attached, at its opposite extremity to the short arm of a bell crank lever 56 that is pivotally mounted as at 58, on the backing plate 11. The free end of the operating lever 44 is connected to the flexible cable 45 and when tension is applied to this cable the lever 44 and its roller 48 is moved inwardly; and the resultant pull on the ribbon 54 moves the rolls 22, 24, 20 and 26 radially outward, and also moves the rollers 16 and 18 away from each other, thereby expanding the brake ring by a combination of radially directed and tangentially directed forces.

A pair of springs 74 and 76 are adapted to hold the ends of the brake ring 12 against the anchor 14, and maintain tension in the actuating ribbon 54 when the brake is released. At the central portion of the brake ring, the side flanges, 13—13, thereof, are cut away to receive the guide block 78, which is rigidly secured to the backing plate 11; and the ring is, at this point, normally held against the outer surface of the block 78 by a pair of compression springs and adjustable bolt connections 84—82, 84—82. In order to permit of a certain amount of circumferential, as well as of radial, movement, the coned heads of the bolts 82—82, are engaged with bevelled slots 80—80 in the web of the ring 12. The inner terminal nuts 83—83 are held against rotation in the recesses of the guide block 78, and by turning the coned heads of the bolts 82 (which can be readily done when the drum 10 is removed) the retractive tension of the springs 84—84 can be readily adjusted.

It will be observed that when the operating lever 44 is moved inwardly, by a pull on the cable 45, the increased tension thereby applied to the ribbon member 54 will first act on the ring rolls 22 and 24; and if the tension of the retracting springs 84—84 is properly adjusted with respect to that of the springs 74 and 76 (which may also, if desired be provided with means for independent adjustment), this action will tend to bring the central portion of the floating brake ring into contact with the revolving drum, before either end of the ring is moved away from the anchor 14; and the initial contact engagement between the relatively movable friction surfaces will then maintain the following or heel terminal of the said ring in constant engagement with this anchor abutment during the subsequent stages of the brake application. This will completely eliminate any "click" or "slam"—such as may occur in one or both directions of drum rotation (forward or reverse braking),—when the ends of the brake ring are separated before the brake ring engages with the moving drum. The adjustment of the retractive spring tensions also permits of the alteration of the contact pressures between different zonal regions of the frictionally engaged surfaces with a corresponding control of the braking torque exerted on the revolving drum by the application of a predetermined pull on the actuating cable 45.

In order to provide an adjustment for the wear of the friction surfaces the anchor block 14 is cut out on one side to form an elongated recess 70, in which are seated the two cooperating, and relatively movable, wedge shaped blocks 60 and 64. The inner face of the movable member 64 is engaged by the end of a screw 68 which is threaded through the adjacent side 66 of the recessed anchor 14. When this screw is turned in such direction as to force the block 64 radially outward the cooperating block 60 will be moved circumferentially to thereby increase the effective width of the anchor and correspondingly separate and expand the ends of the friction shoe 12. The adjusting screw 68 is provided with an enlarged head 72 which is in turn adapted to engage the lever 56, so that upon increasing the width of the anchor, as is done in adjusting for wear, there is a corresponding decrease in the effective or operative length of the ribbon 54 and a simultaneous or concurrent adjustment of the anchor and the actuating means.

Figure 6:
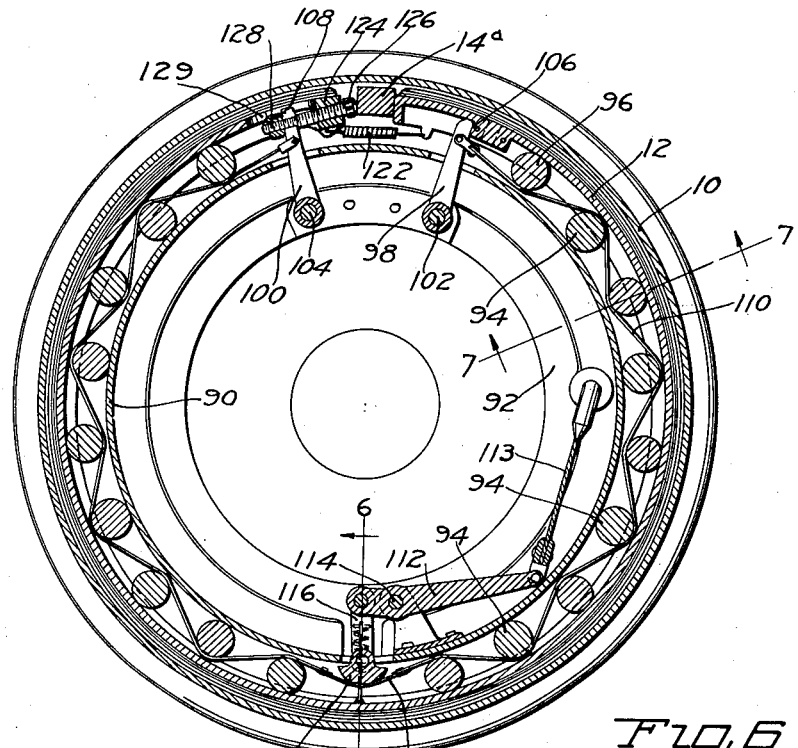
Figure 6 is a front elevation of a modification of the invention illustrated partly in section.
Figures 7, 8:
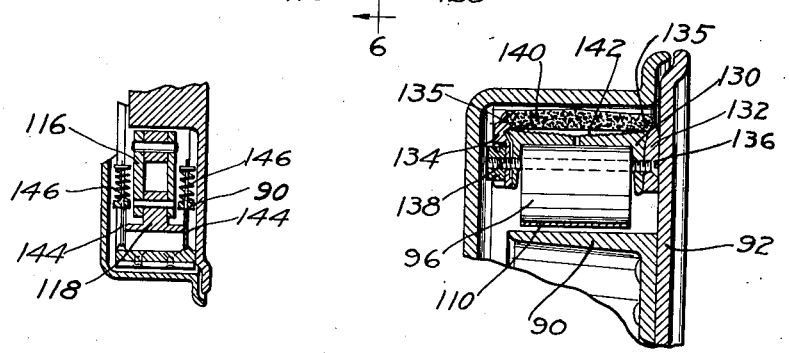
Figure 7 is an enlarged section on the line 7—7 illustrating a thrust roller and showing a member mounted for the friction lining.
Figure 8 is a section of Figure 5 on the line 6—6 showing the actuating mechanism thereof.

In the further illustrative embodiment of my invention which is depicted in Figure 6 there is shown, as in Figure 1, a brake drum 10, a floating friction shoe or ring 12, and a fixed anchor 14a. A circular angular member 90 is secured to the backing plate 92, as shown more particularly in Figure 7, which is provided with a smooth external cylindrical surface for the free rolls 94. Located intermediate each adjacent roll 94 are similar rolls 96 which are adapted to engage the smooth inner surface of the brake shoe 12 which, as may be seen in Figure 7, is of general channel contour. Levers 98 and 100 are pivoted, as shown at 102 and 104, to the backing plate 92, and are adapted to operatively engage abutments 106 and 108 that are carried by the free ends of the brake ring 12; and are also adapted to each carry one end of a flexible ribbon 110 which is carried successively under and over the staggered roll elements 96 and 94. An actuating lever 112 is pivoted at 114 to the backing plate, and carries a short link 116 having a segmental roller 118 which is in turn adapted to engage the central portion of the ribbon 110. At this point, the ribbon may, if desired, be reinforced with a short section 120 which is peculiarly adapted to withstand the fatigue incident to the repeated flexing of such a member.

It will readily be observed that a pull on tension cable 113 will actuate the lever 112 thus thrusting the segmental roller 118 against the ribbon 110 and producing an increased tension therein. This tension will act to exert an interbalanced radial thrust on the rollers 96, and will also act on the levers 98 and 100 to exert a tangential thrust on the ends of the brake ring, and thus bring the different circumferential portions thereof into operative engagement with the revolving drum by a combination of radially applied and tangentially applied forces. A suitable spring 122 may be provided to prevent the separation of the brake ring ends before the thrust of the segmental roller 118 has caused an initial application of the central portion of the brake shoe to the revolving drum, thus preventing the either end of the brake shoe from leaving the anchor until this initial engagement has been effected. This effect may be further controlled, and the subsequent contact pressure engagement of different portions of the ring with the revolving brake drum can be further regulated, by providing two adjustable springs 146—146 (see Fig. 8) which exert a controllable relative pull on the central portion of the brake ring (adjacent to the block 118), and thus modify the action of that block in forcing that portion of the ring outwardly.

This last described construction is also provided with a unit adjustment which performs the dual purpose of expanding the normal or retracted diameter of the brake ring 12, in order to take up clearance due to wear, and of concurrently repositioning the operative members of the actuating mechanism to correspond to this brake ring expansion. This adjustment means comprises a capstan headed screw 126, which engages within and passes through, the reinforced or thickened, end, 124, of the brake ring 12, and which is provided with a slightly reduced and reversely threaded portion 128 that engages and carries the nut 108. This nut—which constitutes the abutment member that is engaged by the bifurcated arms of the lever 100—is slidably mounted in a slot 129, that is cut in the web of the brake ring 12, and is thereby prevented from turning with the screw 124—126—128. When it is desired to expand the normal diameter of the brake ring 12—to adjust for wear—the screw is rotated in such direction as to move the engaged end of the ring further away from the anchor 14 against which the capstan head of the screw abuts; and this rotation concurrently moves the nut 108 toward the anchor by an amount sufficient to prevent any loosening or lost motion in the ribbon 110 or in the cooperating parts of the actuating mechanism.

As shown in Figure 7, the brake shoe ring may be advantageously constructed with a U-shaped channel member 130 and two auxiliary plates 132 and 134 which are clamped against the sides of the channel by means of through bolts 136 and nuts 138, that are located between the rolls 94 and 96 (or between the corresponding elements 16—36, 36—20, etc. of Fig. 1) in such position that they do not intersect the path of movement of the ribbon member 110 (or 54). Each of the removable side plates 134 and 136 is provided with a sharp internal flange 135, which overhangs the outer surface 142 of the member 130 and is adapted to grip the edges of the lining 140 and draw it down against the said surface. The gripping or binding action of the plates 132 and 134, on the lining 140 may be augmented by scoring or roughening the channel surface 142; and by making it slightly concave in cross section. The lining itself may also be advantageously formed with a thickened central portion which will be pressed down against the roughened concave surface of the ring by the braking pressure; and when this construction is used it presents the further advantage of automatically increasing the contact area of the friction surfaces as the braking torque is increased.

It will be readily observed that in the operation of both forms of construction heretofore described, the tension or pull applied to flexible cable (45 or 113) is transmitted to the ribbon element (54 or 110) and that this, in turn expands the brake ring by the conjoint application of a plurality of radially directed and tangentially directed forces which may be symmetrically distributed over the entire length of the said ring; and it will be further observed that the resultant contact pressure engagement on different zones of the friction surfaces may be regulated and controlled—both as order of engagement and as to final magnitude—by adjusting the relative tensions of the various retracting springs, (74—76 and 84, or 122 and 146) so as to avoid clicking and slamming in both forward and reverse braking, and also obtain a smooth graduated action that will prevent or minimize the danger of "grabbing" or locking when the brake is suddenly applied. In this connection it will, of course, be also understood that the spacing of the rollers may be changed at various points, to either increase or decrease the pressure over certain of the intermediate zones; thus modifying the amount of the self energization or self actuation effect developed at these different points; and that the diameter of any one or more of the rollers 96 in Figure 7, or any one of the rollers 20, 22, 24, and 26 of Figure 1 may be likewise varied to produce an increased or decreased radial pressure at these points.

While various embodiments and modifications of the invention have been illustrated and described it is to be understood that the invention is not limited thereto but may be embodied in various mechanical forms; for example, various features of the modifications shown may be interchanged or the number of rollers increased or decreased together with their relative spacing and diameters, without departing from the spirit of the invention, as will be well understood by those skilled in the art; reference being had to the appended claims for a definition of the limits of the invention.

What is claimed is:

1. A brake comprising a drum, friction means therein, a pair of fixed supports, a flexible tension member associated therewith and adapted to be stretched into chordal relation with said drum, and a compression member located between said shoe and said member, adapted to bend said tension member away from the drum.

2. A brake comprising a drum, a support, a friction shoe and a pair of guides adjacent thereto mounted on said support, a tension member adapted to be tensioned between said guides and a member in compression between said shoe and said tension member for engaging said shoe.

3. A brake comprising a drum, a friction shoe therein, and means for applying said shoe to the drum including a flexible tension member arranged beside and along the length of said shoe and of a length substantially the same as that of the friction shoe.

4. An applying means for a brake comprising a shoe, spaced thrust members associated therewith, fixed supports between said spaced thrust members, and a flexible tension member threaded over and between said spaced members and supports for actuating the friction shoe.

5. An internal brake comprising a shoe, spaced rollers engaging the inner surface of said shoe, fixed members between said rollers and adjacent said shoes, and a tension member engaging said rollers and said fixed members in alternate succession, and adapted to move said rollers radially outward.

6. A brake comprising a drum, friction means, a tension member coextensive with said friction means alternately engaging fixed members and shoe thrust members, and applying means for tensioning said tension member.

7. A brake comprising a brake drum, friction means with separable ends and brake applying means comprising a tension member, means for tensioning said member, circumferentially spaced supporting means, thrust means bearing upon the friction means and spaced between the supporting means, the tension member being threaded alternately inside and outside of said thrust means and said supporting means respectively so that by tensioning the tension member radial expanding forces are applied to the friction means, rollers pivoted upon the ends of the friction means and fixed supports adjacent said rollers, the ends of the tension member passing over said rollers and being attached to said fixed supports so that by tensioning the member tangential expanding forces are applied to the ends of the friction means.

8. A brake comprising a brake drum, friction means with separable ends and brake applying means comprising a tension member, means for tensioning said member, circumferentially spaced supporting means, thrust means bearing upon the friction means and spaced between the supporting means, the tension member being threaded alternately inside and outside of said thrust means and said supporting means respectively so that by tensioning the tension member radial expanding forces are applied to the friction means, rotatable levers on fixed pivots having ends bearing upon the ends of the friction means, the ends of the tension member being attached to said levers so that by tensioning the member tangential expanding forces are applied to the ends of the friction means.

9. A brake comprising a brake drum, friction means with separable ends and brake applying means comprising a tension member, means for tensioning said member, circumferentially spaced supporting means, thrust means bearing upon the friction means and spaced between the supporting means, the tension member being threaded alternately inside and outside of said thrust means and said supporting means respectively so that by tensioning the tension member radial expanding forces are applied to the friction means, and means whereby the tension member coacts with the ends of the friction means so that by tensioning said member said ends are subjected to tangential expanding forces.

10. A brake comprising a drum, a friction shoe having separable ends, an anchor between said ends, and applying means acting on said ends to apply brake-applying tangentially-directed forces thereto, said means including parts arranged to apply radially directed forces to intermediate portions of said shoe and a member extending circumferentially of the shoe and acting on said parts to urge them radially outward when the brake is applied.

F. L. O. WADSWORTH.